(12) United States Patent
Erdei et al.

(10) Patent No.: US 8,120,827 B2
(45) Date of Patent: Feb. 21, 2012

(54) HOLOGRAPHIC STORAGE SYSTEM FOR READING A HOLOGRAM STORED ON A HOLOGRAPHIC STORAGE MEDIUM AND A METHOD CARRIED OUT THEREWITH

(75) Inventors: Gábor Erdei, Budapest (HU); Ferenc Ujhelyi, Mogyoród (HU)

(73) Assignee: Bayer Innovation GmbH, Duesseldorf (DE)

( * ) Notice: Subject to any disclaimer, the term of this patent is extended or adjusted under 35 U.S.C. 154(b) by 189 days.

(21) Appl. No.: 12/526,033

(22) PCT Filed: Jan. 24, 2008

(86) PCT No.: PCT/EP2008/000516
§ 371 (c)(1),
(2), (4) Date: Aug. 5, 2009

(87) PCT Pub. No.: WO2008/095607
PCT Pub. Date: Aug. 14, 2008

(65) Prior Publication Data
US 2010/0103487 A1   Apr. 29, 2010

(30) Foreign Application Priority Data
Feb. 6, 2007  (HU) .................................... 0700133

(51) Int. Cl.
G03H 1/12 (2006.01)
G03H 1/22 (2006.01)
G03H 1/04 (2006.01)

(52) U.S. Cl. ............... 359/11; 359/32; 359/35; 369/103
(58) Field of Classification Search .......................... None
See application file for complete search history.

(56) References Cited

U.S. PATENT DOCUMENTS

| 5,838,650 | A | * | 11/1998 | Campbell et al. ............. 369/103 |
| 7,095,540 | B1 | | 8/2006 | Javidi et al. |
| 7,116,626 | B1 | | 10/2006 | Woods et al. |
| 7,154,646 | B2 | * | 12/2006 | Kawano et al. ................. 359/11 |
| 2002/0075776 | A1 | | 6/2002 | Kasazumi et al. |

(Continued)

FOREIGN PATENT DOCUMENTS
EP   1492095   12/2004
WO   0205270   1/2002

OTHER PUBLICATIONS

International Search Report of PCT/EP2008/000516, dated Mar. 6, 2008 (3 pages).
Psaltis et al., "Holographic Storage Using Shift Multiplexing", Optics Letters, OSA, Optical Society of America, Wahsington, DC, vol. 20, No. 7, Apr. 1, 1995; pp. 782-784.

(Continued)

Primary Examiner — Jade R Chwasz
(74) Attorney, Agent, or Firm — Baker, Donelson, Bearman, Caldwell & Berkowitz, PC

(57) ABSTRACT

A holographic storage system for reading a hologram stored on a holographic storage medium. The system comprises: storage medium holding means; a spatial light modulator (SLM) for encoding a reference beam with a code pattern; a detector; and a servo control unit for determining a misalignment of the reference beam and the storage medium from the detected image and for acting upon the SLM to shift the code pattern. A method of reading a hologram stored on a holographic storage medium comprising: a) encoding a reference beam with a code pattern created by a spatial light modulator (SLM); b) detecting an image of the reconstructed hologram; c) determining a misalignment of the reference beam and the storage medium from the detected image; and d) shifting the code pattern on the SLM based at least in part on the misalignment.

19 Claims, 4 Drawing Sheets

U.S. PATENT DOCUMENTS

2005/0111335 A1    5/2005    Kasazumi et al.
2005/0174621 A1    8/2005    Edwards
2005/0286388 A1    12/2005    Ayres et al.
2006/0152783 A1    7/2006    Butler et al.

OTHER PUBLICATIONS

Lamacchia et al., "Coded Multiple Exposure Holograms," Applied Optics, Jan. 1968, vol. 7, No. 1 (XP-002447804).

* cited by examiner

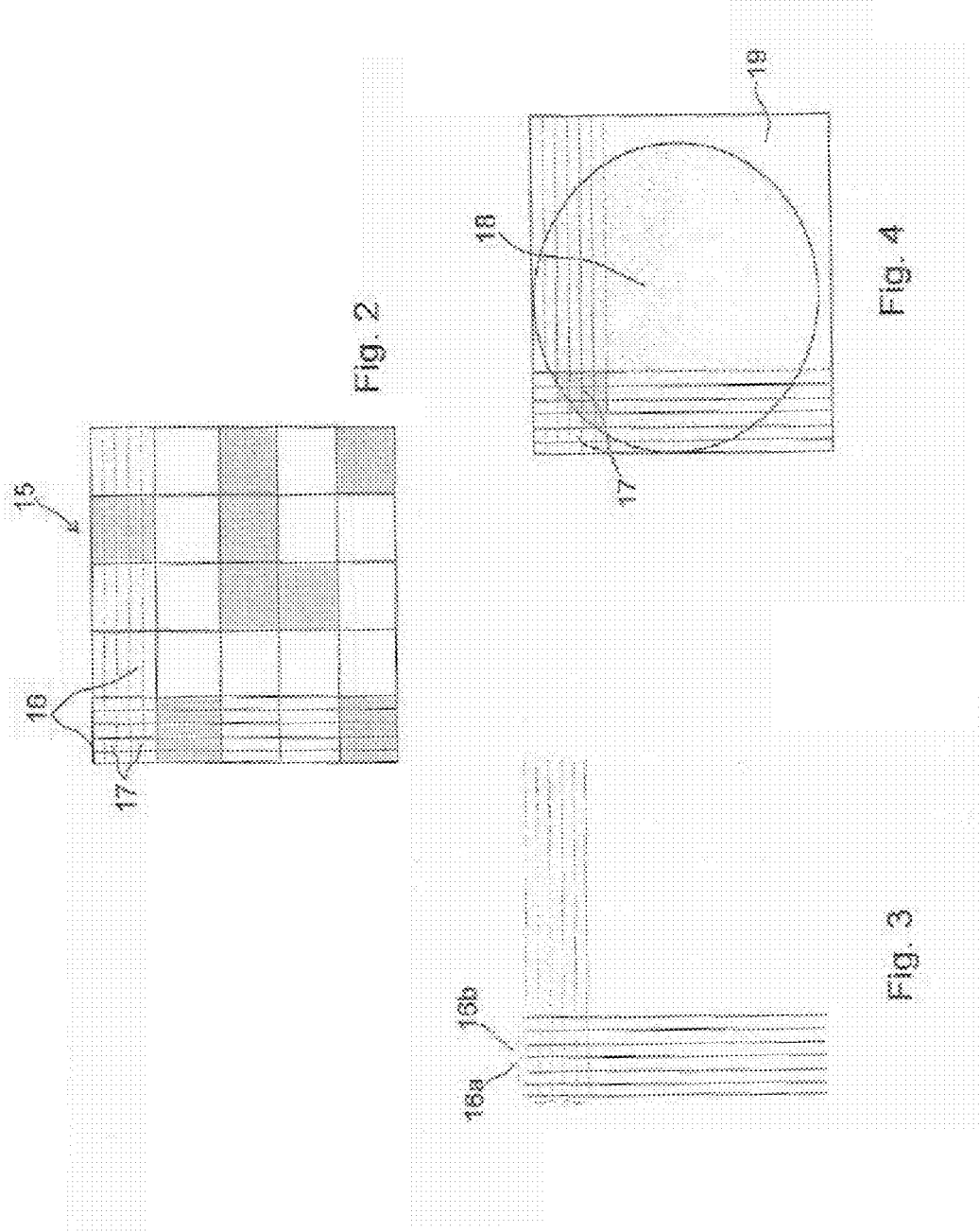

HOLOGRAPHIC STORAGE SYSTEM FOR READING A HOLOGRAM STORED ON A HOLOGRAPHIC STORAGE MEDIUM AND A METHOD CARRIED OUT THEREWITH

CROSS REFERENCE TO RELATED APPLICATIONS

This application is a §371 National Stage Application of PCT/EP2008/000516 filed Jan. 24, 2008 which claims priority from Hungarian Application P 07 00133 filed Feb. 6, 2007.

BACKGROUND OF THE INVENTION

1. Field of the Invention

The present invention relates to the reconstruction of holograms, in particular to a holographic storage system for reading a hologram stored on a holographic storage medium and a method carried out therewith.

2. Description of Related Art

Holographic data storage is based on the concept of recording the interference pattern of a data-encoded signal beam (also referred to as an object beam) carrying the data and of a reference beam at a holographic storage medium. Generally a spatial light modulator (SLM) is used for creating the object beam and the holographic storage medium can be for example a photopolymer or photorefractive crystal or any other material which is suitable for registering the relative amplitudes of, and phase differences between the object beam and the reference beam. After a hologram is created in the storage medium, projecting the reference beam into the storage medium interacts and reconstructs the original data-encoded object beam, which can be detected by a detector such as a CCD-array camera or the like. The reconstructed data-encoded object beam is generally referred to in the art as the reconstructed hologram itself. According to this terminology reconstruction of a hologram means the reconstruction of the original data-encoded object beam; and reading of the hologram means detecting the reconstructed hologram, in particular an image of the reconstructed hologram. This terminology is adapted in the present specification.

The writing of holograms is greatly influenced by the spatial overlap of the object beam and the reference beam, while hologram reading is strongly affected by the relative position of the reconstructing reference beam and the hologram stored in the storage medium. Reading of a holographic storage medium can be relatively easily achieved if both the reference beam and the object beam cover a relatively large spot on the surface of the storage medium. The tolerance of displacement between the centre of the hologram and the centre of the reference beam is approximately 10% of the size of the beam diameter, which is usually within the mechanical limits of conventional systems. However, decreasing the hologram size leads to a higher demand on alignment of the reference beam and the hologram when reading the medium. High-precision alignment can also be necessary for example, in case of multiplexing and/or security encrypting the stored holographic data.

There are many known methods of multiplexing and/or encrypting holograms. Such methods may involve phase coding the object beam and/or the reference beam both in the real and/or in the Fourier-plane. A method of, and device for, phase coded multiplexing and encrypting by phase coding the reference beam is disclosed in WO 02/05270 A1. When applying phase coded multiplexing or encrypting the tolerance of displacement between the centre of the reference beam and the hologram during reconstruction of the hologram can drop to 1% of the beam diameter. Misalignment of the beam and the hologram is generally associated with the misalignment of the optical components of the system, which can be due to mechanical shocks, temperature changes, etc. It is however a particular problem of systems designed to receive removable storage medium, for example holographic identification cards.

U.S. Pat. No. 7,116,626 B1 teaches a micro-positioning method to overcome the above identified problem of misalignment. The object of the described method is to increase the performance of a holographic storage system, i.e., the quality of the modulated image, by ensuring the correct alignment of various components of the system such as an SLM with various devices, such as light sources, lenses, detectors, and the storage medium. The alignment technique focuses on "pixel matching" that is aligning the pixels of a unique SLM used for data-encoding the object beam, the stored holographic image and the detector so that each pixel of the SLM is projected onto a single pixel of the detector resulting in better data recovering efficiency. The method involves physically moving all or some of the said components of the system with respect to each other. The means for displacing the said components can include micro-actuators. Such physical displacing means are expansive and complicated to apply in small devices.

SUMMARY OF THE INVENTION

The object of the invention is to overcome the above problems by providing a system and method for enabling precise non-mechanical alignment of a reference beam with respect to a holographic storage medium.

The above object is achieved by providing a holographic storage system according to claim 1 and a method of reading a hologram according to claim 15.

Further details of the invention will be apparent from the accompanying figures and exemplary embodiments.

BRIEF DESCRIPTION OF THE DRAWINGS

FIG. 2 shows an exemplary reference beam code pattern generated by a spatial light modulator.

FIG. 3 illustrates the shifting of the reference beam code pattern by one SLM pixel.

FIG. 4 shows another exemplary reference beam code pattern generated by a spatial light modulator.

DETAILED DESCRIPTION OF A PREFERRED EMBODIMENT

Figure 1A:
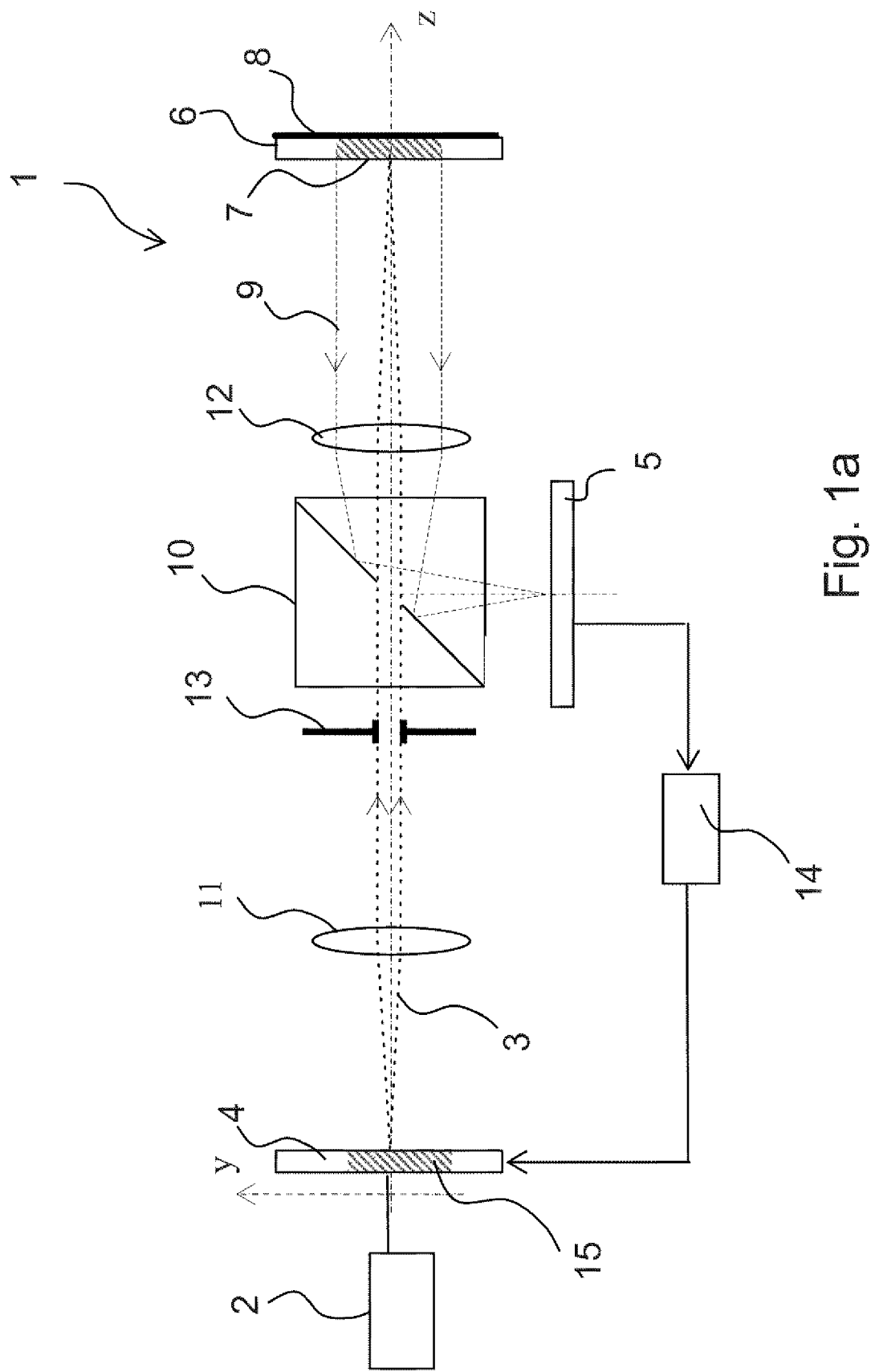
FIG. 1a is a schematic view of an exemplary embodiment of a reflection type holographic storage system according to the invention.

FIG. 1a is a schematic view showing a first exemplary embodiment of a holographic storage system 1 according to the invention. The system 1 comprises a light source 2 providing a reference beam 3. The light source 2 generally consists of a laser and a beam expander. The light source 2 is followed by a spatial light modulator (SLM) 4 encoding the reference beam 3. The system 1 further comprises a detector 5 and means (not shown) arranged along an optical path of the reference beam for holding a holographic storage medium 6 carrying a hologram 7 to be read. The storage medium holding means can be any conventional medium-receiving component, such as a CD or DVD tray, a holographic identification card slot, or any other means suitable for keeping the storage medium 6 at a well-defined location within the holographic storage system 1. The detector 5 can be a CCD camera, a CMOS, a photodiode matrix or any other known detector type comprising sensor elements arranged in a pixel array.

The hologram 7 is preferably a Fourier-hologram, due to its smaller sensitivity to surface defects of the storage medium than that of image plane holograms. In case of a Fourier hologram, the phase code pattern displayed by the SLM 4, used for phase-coding the reference beam 3, is imaged onto the Fourier-transform of an object beam when creating the hologram 7. Because of its good diffraction efficiency and low wavelength selectivity, e.g. a thin polarisation hologram can be used. Suitable holographic storage media are e.g. azo-benzene type photoanizotropic polymers.

The embodiment shown in FIG. 1a is designed for reading the holographic storage medium 6 in reflection mode: the reference beam 3 is reflected from a mirror 8 behind the medium 6 and the reconstructed object beam 9 is imaged onto the imaging plane of the detector 5 for capturing an image of the reconstructed hologram 7. The reflected beam 9 and the reference beam 3 are separated from each other by a beam splitter 10, which can be a neutral beam splitter or a polarisation beam splitter in case of polarisation holograms, or any other beam separation element such as a beam splitter cube with a central layer discontinuity, as disclosed in EP 1 492 095 A2.

In case of an encoded reference beam 3, the SLM 4 is imaged into the plane of the hologram 7 by an imaging system. This imaging system comprises preferably a first and second Fourier lenses 11 and 12, arranged before and after the beam splitter 10 as known in the art. Furthermore, an aperture 13 can be interposed between the first Fourier lens 11 and the beam splitter 10 improving the imaging quality by limiting the diameter of the beam and providing the further advantage of restricting the definition of the SLM 4 as will be explained later on.

The reference beam encoding is preferably phase coding to avoid information loss present at amplitude encoding, although amplitude encoding can be applied too, or any other known light modulation encoding (e.g. polarisation encoding, wavelength encoding). The phase code can be for example a security key for reading an encrypted hologram 7 or a key for reading a multiplexed hologram 7. However, the invention also relates to applications other than encryption or multiplexing. It is also applicable in all cases where a mechanical clearance cannot be excluded, leading to a certain uncertainty of the position of the inserted storage medium 6, thus the reference beam 3 and the storage medium 6 need to be repeatedly repositioned with respect to each other, especially if the storage medium 6 is often removed or a plurality of storage media 6 are to be read with the system 1.

In addition to reference beam phase encoding, the SLM 4 can also be used as an aperture creating an easy to position circular reference beam 3. This is useful to reduce inter-hologram cross-talk at hologram reconstruction when multiple holograms 7 are written close to each other into the storage medium 6.

When reading the hologram 7 of the storage medium 6, the reference beam 3 needs to be positioned with respect to the storage medium 6. According to the invention the positioning of the reference beam 3 is carried out by displaying a reference beam code pattern encoding the reference beam 3 at different positions on the SLM 4. This is achieved by a servo control unit 14, which is connected to the detector 5 for analysing the image detected by the detector 5 and computing a servo signal as will be explained later on. The servo signal is used for controlling the position of the code pattern displayed by the SLM 4. The servo control unit 14 can be for example a computer, microcontroller or any application-specific electric circuit with the necessary software to operate the SLM 4.

Figure 1B:
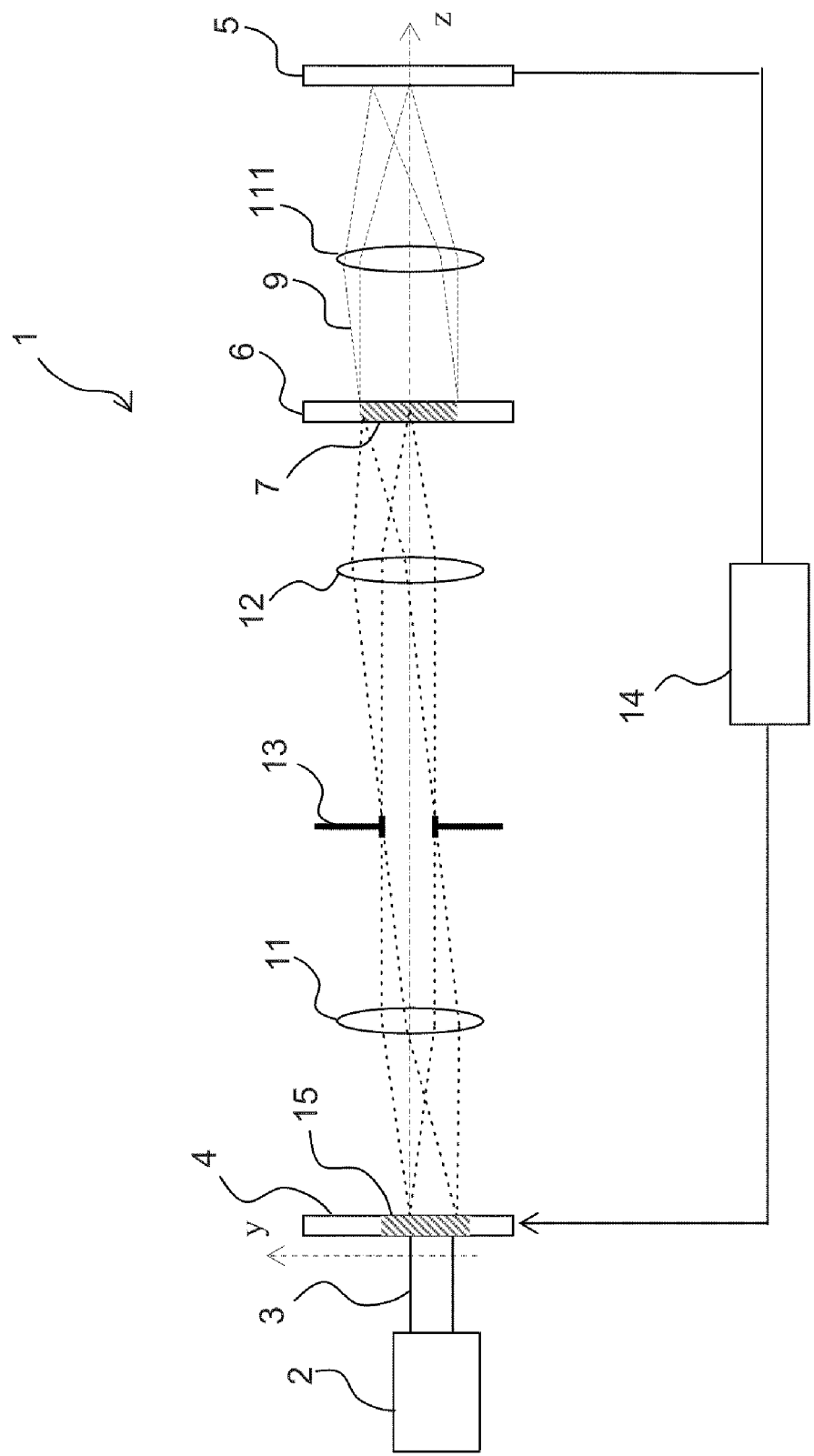
FIG. 1b is a schematic view of another exemplary embodiment of a transmission type holographic storage system according to the invention.

FIG. 1b illustrates another preferred embodiment of the holographic storage system 1, where the holographic storage medium 6 is read in transmission mode, i.e. the reconstructed object beam 9 is transmitted through the storage medium 6. Accordingly, the detector 5 is arranged on the opposite side of the storage medium 6 and a third Fourier lens 111 can be interposed between the detector 5 and the storage medium 6 for imaging the reconstructed object beam 9 onto the imaging plane of the detector 5.

Figure 1C:
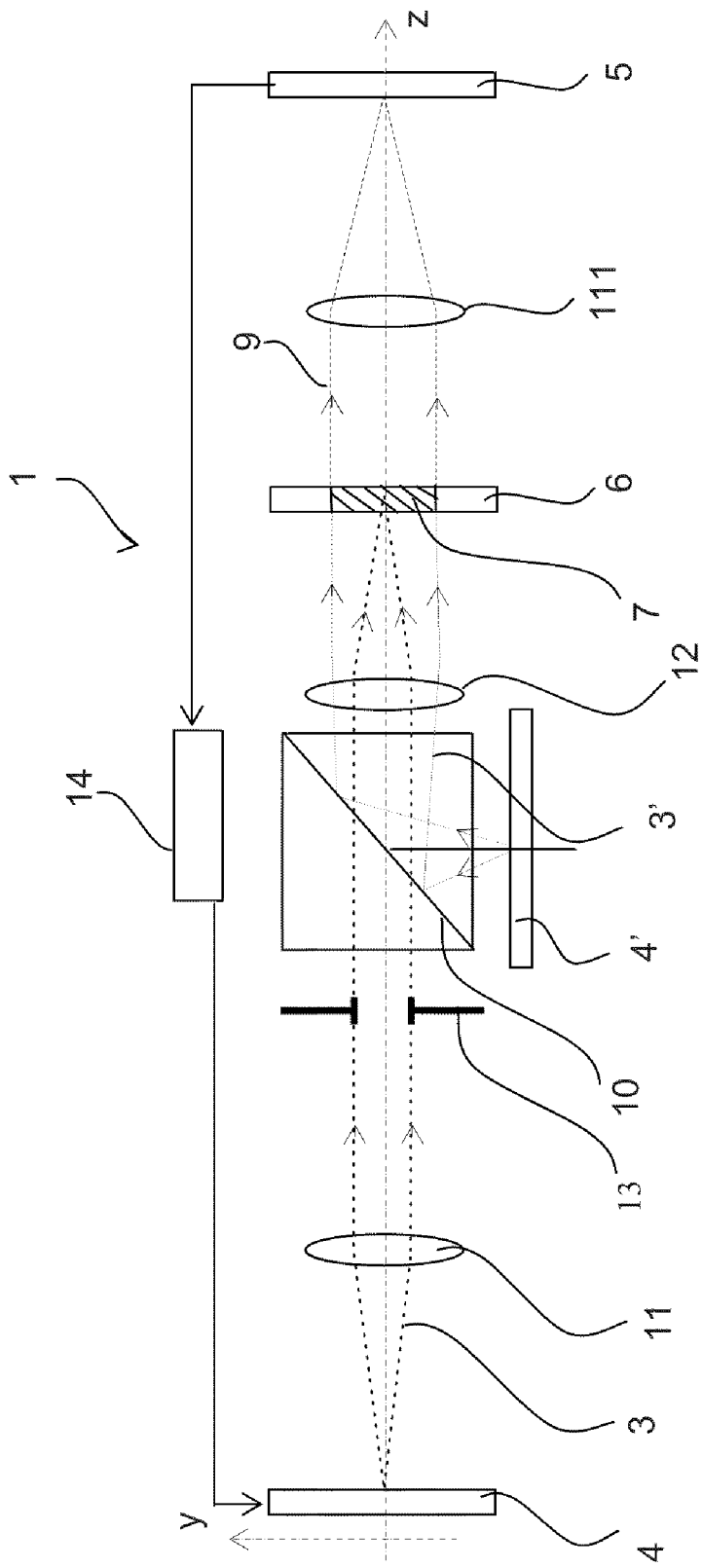
FIG. 1c is a schematic view of an exemplary embodiment of a transmission type holographic storage medium reading and writing system according to the invention.

FIG. 1c illustrates another preferred embodiment of the holographic storage system 1, which is adapted both for reading and writing holographic storage media 6. Similarly to the embodiment of FIG. 1b the storage medium 6 is read in transmission mode. In this case the beam splitter 10 is used to unite the reference beam 3 and an object beam 3' coming from an object beam SLM 4' when the system 1 is used for recording a hologram 7 on a storage medium 6. The object beam 3' can be provided with a separate light source (not shown), or the light source 2 of the reference beam 3 can be used to provide both beams 3 and 3' as known in the art.

FIG. 2 illustrates a reference beam phase code pattern 15 displayed on the SLM 4. According to the depicted embodiment each reference beam code pixel 16 consists of 5×5 SLM pixels 17. The number of SLM pixels 17 used for displaying a single code pixel 16 can vary depending on the application. Using code pixels 16 consisting of more than one SLM pixel 17 allows for a simple way of shifting the code pattern 15. For example to shift the code pattern 15 by one SLM pixel 17 to the right each code pixel 16a is shifted by one row of SLM pixels 17 as demonstrated in FIG. 3. The new code pixel 16b is displayed by a new block of 5×5 SLM pixels 17 consisting of 5×4 SLM pixels 17 overlapping with the original code pixel 16a and 1×4 SLM pixels 17 to the right from the original code pixel 16a. The code pattern 15 can be shifted in any direction following the above concept, including directions not parallel with the rows or columns of the SLM pixels 17.

A hologram 7 recorded with a particular reference beam phase code pattern 15 can only be reconstructed with a reference beam encoded with a phase code pattern 15 identical or highly similar to the one used for recording the hologram 7, thus encoding the reference beam 3 allows for security encryption or multiplexing. The reference beam code pattern 15 can for example have a size of 10×10 code pixels 16 leading to 2100 possible code combinations. However, for the purpose of security encryption and multiplexing the hologram 7 should not be readable with reference beam code patterns 15 other than the one used for recording the hologram 7. Therefore only a set of sufficiently distinct code patterns 15 can be used out of the total possible code patterns 15, which in practice is still a very high number, e.g. about 225 code combinations could be used. A method of generating distinct code patterns 15 is disclosed in WO 02/05270.

Using the aperture 13 has the additional benefit of restricting the definition of the SLM 4, so that the individual SLM pixels 17 are not distinguishable on the image detected by the detector 5 while the encoding effect of the code pixels 16 is still perceptible. To avoid vignetting effects near the edges of SLM 4, the aperture 13 is arranged in the Fourier plane of the SLM 4 (or its close vicinity) in order to filter the high frequency components in the Fourier space thereby blurring the resulting image.

Beside phase modulation the code pattern 15 can be created by modulating any other light property or a combination thereof (including phase, amplitude, wavelength and polarisation) as known in the art.

In applications where the SLM 4 is used as an aperture for creating an easy to position circular beam, the reference beam code pattern 15 can be a simple light transmitting inner circle 18 with a non-transparent outer border zone 19 as illustrated in FIG. 4. This can be achieved for example by using the SLM 4 in amplitude modulation mode and decreasing the amplitude of the border zone 19 while conserving the amplitude of the light within the transmitting circle 18 thus creating the easy to position circular reference beam 3. The circular reference beam 3 can be easily positioned by changing the amplitude modulation of the individual SLM pixels 17 so as to create the light transmitting inner circle 18 at another location of the SLM 4.

A known method to realise amplitude modulation mode is to provide a polariser before and an analyser after the SLM 4. The polarisation of the reference beam 3 falling within the inner circle 18 can be left unchanged by the SLM 4, while it can be rotated by 90 degrees within the outer border zone 19. Only the unchanged polarisation will pass through the analyser thus creating the easy to position circular reference beam 3.

The easy to position circular reference beam 3 can be provided together with phase coding as well, either using the same or a further reference beam encoding SLM 4 disposed along the optical path of the reference beam 3. The same SLM can be used for simultaneous phase and amplitude modulation e.g. in ternary modulation mode of special SLMs. Using two SLMs for separate phase and amplitude modulation requires additional optical elements to image the two SLMs onto each other.

Considering one SLM pixel 17 as one code pixel 16 is also at hand for a phase-coded reference beam 3, however it is advantageous to be able to shift the phase pattern in finer steps than the size of a code pixel 16 for the purpose of calculating a misalignment between the reference beam 3 and the storage medium 6.

The code pattern 15 can be created in any other known way as well as long as it is possible to shift the code pattern 5 on the SLM 4.

Various known methods exist for determining the misalignment of the reference beam 3 and the storage medium from the detected restored image of the hologram 7. For example, a figure of merit associated with the detected image can be determined. The figure of merit is generally a scalar quantity indicative of the pixel misalignment, e.g. average pixel intensity or signal to noise ratio. An example for using figures of merit can be found in U.S. Pat. No. 7,116,626 B1 (referred to as a channel metric).

Once the misalignment is determined the reference beam 3 can be repositioned by shifting the code pattern 15 on the SLM. The figure of merit is only suitable for indicating the magnitude or degree of misalignment but not the direction of the misalignment. Consequently, if a figure of merit is used for describing the misalignment the figure of merit may need to be recalculated at a number of different reference beam positions.

A preferred way of calculating a figure of merit is disclosed in the Hungarian patent application entitled "Method of reading a Fourier hologram recorded on a holographic storage medium and a holographic storage system" (filed on 2 Feb. 2007) of the applicant.

The above-described embodiments are intended only as illustrating examples and are not to be considered as limiting the invention. Various modifications will be apparent to a person skilled in the art without departing from the scope of protection determined by the attached claims.

The invention claimed is:

1. A holographic storage system for reading a hologram stored on a holographic storage medium, said system comprising:
   storage medium holding means arranged along an optical path of a reference beam;
   a spatial light modulator (SLM) arranged along said optical path for encoding a reference beam with a code pattern;
   a detector for detecting an image of a reconstructed hologram; and
   a servo control unit for determining a misalignment of said reference beam and said storage medium from the detected image and for acting upon said SLM to shift said code pattern.

2. The system according to claim 1, wherein the SLM is a pixel array type light modulator, a liquid crystal display or a liquid crystal on silicon display.

3. The system according to claim 2, wherein the code pattern consists of a plurality of code pixels, the code pixels consisting of n×m pixels of the SLM.

4. The system according to claim 3, wherein shifting said code pattern is performed by displaying said code pixels by different n×m pixels of the SLM.

5. The system according to claim 3, wherein the code pattern is a phase code pattern.

6. The system according to claim 1, wherein the code pattern comprises a circular inner zone surrounded by a border zone the two zones modulating at least one light property of the reference beam in different ways.

7. The system according to claim 6, wherein the circular inner zone is light transmitting and the border zone is non-transparent.

8. The system according to claim 6, wherein polarisation of light effected by the circular inner zone and polarisation of light effected by the border zone are at an angle to each other; and a polariser is arranged before the SLM and an analyser is arranged after the SLM along said optical path of the reference beam.

9. The system according to claim 1, wherein said hologram is a Fourier-transform hologram.

10. The system according to claim 9, wherein a first and a second Fourier-transform lenses are arranged between said SLM and said storage medium along said optical path.

11. The system according to claim 10, wherein an aperture is arranged between said first and second Fourier-transform lenses.

12. The system according to claim 1, comprising an object beam modulating SLM for creating a data-encoded object beam and means for uniting the encoded reference beam and the encoded object beam for writing a hologram.

13. The system according to claim 1, wherein said reference beam code pattern is a phase, amplitude, wavelength or polarisation-modulation pattern created by the SLM.

14. The system according to claim 1, wherein said detector is a detector comprising sensor elements arranged in a pixel array.

15. A method of reading a hologram stored on a holographic storage medium comprising:

a) encoding a reference beam with a code pattern created by a spatial light modulator (SLM);
b) detecting an image of a reconstructed hologram;
c) determining a misalignment of said reference beam and said storage medium from the detected image; and
d) shifting said code pattern on the SLM based at least in part on said misalignment.

16. The method according to claim 15, wherein the SLM is a pixel array type light modulator, and shifting said code pattern is carried out by using different SLM pixels for creating the code pattern.

17. The method according to claim 16, wherein the code pattern consists of a plurality of code pixels, the code pixels consisting of n×m pixels of the SLM.

18. The method according to claim 17, wherein using different SLM pixels for creating the code pattern consists of forming said code pixels by different n×m pixels of the SLM.

19. The method according to claim 18, wherein determining said misalignment includes calculating a figure of merit.

* * * * *